(12) United States Patent
Yang et al.

(10) Patent No.: US 10,668,702 B2
(45) Date of Patent: Jun. 2, 2020

(54) CONDUCTIVE FILMS AND ELECTRONIC DEVICES INCLUDING THE SAME

(71) Applicant: SAMSUNG ELECTRONICS CO., LTD., Suwon-si, Gyeonggi-do (KR)

(72) Inventors: Daejin Yang, Yeongju-si (KR); Weonho Shin, Seoul (KR); Yun Sung Woo, Yongin-si (KR); Hyeon Cheol Park, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 150 days.

(21) Appl. No.: 15/296,313

(22) Filed: Oct. 18, 2016

(65) Prior Publication Data
US 2017/0113443 A1    Apr. 27, 2017

(30) Foreign Application Priority Data
Oct. 27, 2015  (KR) ...................... 10-2015-0149205

(51) Int. Cl.
| | | |
|---|---|---|
| B32B 27/06 | (2006.01) |
| C08G 18/50 | (2006.01) |
| C08G 18/38 | (2006.01) |
| C08G 18/67 | (2006.01) |
| B32B 17/10 | (2006.01) |
| B32B 27/28 | (2006.01) |
| B32B 27/36 | (2006.01) |

(52) U.S. Cl.
CPC ............. *B32B 27/06* (2013.01); *B32B 17/10* (2013.01); *B32B 27/281* (2013.01); *B32B 27/365* (2013.01); *C08G 18/3812* (2013.01); *C08G 18/5015* (2013.01); *C08G 18/672* (2013.01); *C08G 18/673* (2013.01); *B32B 2307/202* (2013.01); *B32B 2307/418* (2013.01); *B32B 2457/20* (2013.01)

(58) Field of Classification Search
CPC ................ H01B 1/02–026; H01B 1/04; H01B 1/06–10; H01B 1/20–24; C08G 18/5015; C08G 18/3812; C08G 18/672–673
See application file for complete search history.

(56) References Cited

U.S. PATENT DOCUMENTS

| | | | | |
|---|---|---|---|---|
| 4,321,404 A | * | 3/1982 | Williams | .............. C08F 291/18 |
| | | | | 427/146 |
| 4,472,480 A | * | 9/1984 | Olson | ................ C08G 65/3322 |
| | | | | 428/332 |
| 4,567,073 A | * | 1/1986 | Larson | ................ C08G 65/007 |
| | | | | 428/40.7 |
| 7,250,227 B2 | | 7/2007 | Itai et al. | |
| 7,781,763 B2 | | 8/2010 | Hahn et al. | |
| 8,906,547 B2 | | 12/2014 | Taniguchi et al. | |

(Continued)

FOREIGN PATENT DOCUMENTS

| | | |
|---|---|---|
| KR | 1439538 B1 | 9/2014 |
| KR | 1471868 B1 | 12/2014 |

*Primary Examiner* — Z. Jim Yang
(74) *Attorney, Agent, or Firm* — Cantor Colburn LLP

(57) ABSTRACT

A conductive film including: a substrate; an electrically conductive layer disposed on the substrate, wherein the electrically conductive layer includes a plurality of nano-sized conductors; and a protective layer disposed directly on the electrically conductive layer, wherein the protective layer includes a crosslinked polymer having a perfluorinated backbone.

16 Claims, 9 Drawing Sheets

(56) References Cited

U.S. PATENT DOCUMENTS

| | | | |
|---|---|---|---|
| 2003/0107026 A1* | 6/2003 | Fujiki | C08G 65/007 252/500 |
| 2005/0249940 A1* | 11/2005 | Klun | C08G 65/226 428/323 |
| 2006/0216524 A1* | 9/2006 | Klun | C08G 18/3825 428/423.1 |
| 2007/0286992 A1* | 12/2007 | Coggio | G02B 1/111 428/212 |
| 2010/0173093 A1* | 7/2010 | Radcliffe | B32B 7/02 427/508 |
| 2011/0118405 A1* | 5/2011 | Suzuki | C08F 299/065 524/533 |
| 2011/0200826 A1* | 8/2011 | Wilczek | C09D 183/08 428/412 |
| 2012/0024572 A1* | 2/2012 | Naoi | C08K 3/08 174/126.1 |
| 2012/0073947 A1* | 3/2012 | Sakata | G06F 3/044 200/600 |
| 2012/0217453 A1* | 8/2012 | Lowenthal | C09D 11/52 252/513 |
| 2013/0084458 A1* | 4/2013 | Yamada | B82Y 30/00 428/421 |
| 2013/0201660 A1* | 8/2013 | Barbier | B32B 33/00 362/97.1 |
| 2013/0319729 A1* | 12/2013 | Poon | H05K 1/0296 174/250 |
| 2013/0342221 A1* | 12/2013 | Virkar | C09D 11/037 324/661 |
| 2014/0022644 A1* | 1/2014 | Hao | G02B 1/111 359/586 |
| 2014/0106154 A1* | 4/2014 | Kim | H01B 1/22 428/220 |
| 2014/0302326 A1* | 10/2014 | Shin | G02B 1/10 428/412 |
| 2014/0356582 A1* | 12/2014 | Zhang | H01B 1/02 428/172 |
| 2015/0000960 A1* | 1/2015 | Gaynor | H01B 1/16 174/251 |
| 2015/0129496 A1* | 5/2015 | Sanguineti | B01D 61/364 210/640 |
| 2015/0235728 A1* | 8/2015 | Poon | H05K 1/0274 428/221 |
| 2016/0040023 A1* | 2/2016 | Ishii | C09D 11/52 349/12 |
| 2016/0342247 A1* | 11/2016 | Jin | C03C 17/09 |
| 2017/0200525 A1* | 7/2017 | Kim | H01B 1/02 |
| 2017/0298242 A1* | 10/2017 | Mostowy-Gallagher | H01B 1/20 |

* cited by examiner

FIG. 2

| Window |
| --- |
| Second optically clear adhesive layer |
| Second transparent electrically conductive film |
| First optically clear adhesive layer |
| First transparent electrically conductive film |
| Display panel |

CONDUCTIVE FILMS AND ELECTRONIC DEVICES INCLUDING THE SAME

CROSS-REFERENCE TO RELATED APPLICATIONS

This application claims priority to Korean Patent Application No. 10-2015-0149205 filed in the Korean Intellectual Property Office on Oct. 27, 2015, and all the benefits accruing therefrom under 35 U.S.C. § 119, the content of which is incorporated herein in its entirety by reference.

BACKGROUND

1. Field

A conductive film and an electronic device including the same are disclosed.

2. Description of the Related Art

An electronic device like a flat panel display such as LCD or LED, a touch screen panel, a solar cell, a transparent transistor, and the like include a transparent electrode (e.g., transparent conductive film). Materials for the transparent electrode may be required to have high light transmittance (e.g., greater than or equal to about 70%) in a wavelength range of 380 nanometers (nm) to 780 nm, and low sheet resistance of, for example, less than or equal to 100 ohms per square (ohm/sq) or less than or equal to 50 ohm/sq, when they form a thin film.

One of currently widely-used materials for a transparent electrode is indium tin oxide (ITO). The ITO has sufficient transmittance in a full visible light range, but has sheet resistance of greater than or equal to 100 ohm/sq prepared by a room temperature deposition process. In addition, the cost of ITO—is inevitably high due to limited resources of indium. Moreover, ITO may not be appropriate for use as an electrode in a flexible display due to excessive brittleness.

Accordingly, in order to find out an alternative for the ITO, research efforts have been undertaken to develop a conductive film using an electrically conductive layer that includes an electrically conductive nano-structures such as an electrically conductive metal mesh, an electrically conductive metal nano wire, an electrically conductive metal or metal oxide nano sheet, graphene, a carbon nanotube, and the like. However, such nano-structures tend to be easily damaged by external environmental conditions (for example, moisture, air, or various chemical materials) or an external force (for example, a mechanical stimulus), so the conductive film including the nanostructures may need a protective layer to protect the electrically conductive layer.

SUMMARY

An embodiment provides a conductive film including a protective layer capable of protecting an electrically conductive layer effectively and capable of improving optical properties thereof.

Another embodiment provides an electronic device including the conductive film.

In an embodiment, a conductive film includes a substrate; an electrically conductive layer disposed on the substrate, wherein the electrically conductive layer includes a plurality of nano-sized conductors; and a protective layer directly disposed on the electrically conductive layer, wherein the protective layer includes a crosslinked polymer having a perfluorinated backbone.

The substrate may include glass, a polyester, a polycarbonate, a polyimide, or a combination thereof.

The electrically conductive layer may include a discontinuous layer including two or more of the nano-sized conductors, wherein the two or more of the nano-sized conductors contact one another to provide an electrical connection.

The nano-sized conductor may include an electrically conductive metal nano wire, an electrically conductive metal nano sheet, an electrically conductive metal oxide nano sheet, an electrically conductive metal chalcogenide nano sheet, an electrically conductive metal nano mesh, graphene, an electrically conductive carbon nanotube, or a combination thereof.

The electrically conductive layer may include an organic binder for binding the nano-sized conductors.

The electrically conductive layer may include an open space disposed between the nano-sized conductors, and an area ratio of the open space relative to the total area of the electrically conductive layer may be less than or equal to about 50%.

The crosslinked polymer may be a crosslinked polymer of a urethane (meth)acrylate.

The crosslinked polymer including the urethane (meth)acrylate may include a C6 to C10 alicyclic moiety or a C6 to C10 aromatic moiety in the backbone.

The perfluorinated backbone may include a linear or branched perfluoropolyether, a linear or branched perfluoropolyolefin, a linear or branched fluoropolyolefin, or a combination thereof.

The perfluorinated backbone may have a weight average molecular weight of greater than or equal to about 1,000 Daltons.

The perfluorinated backbone may include a repeating unit represented by Chemical Formula 1, a repeating unit represented by Chemical Formula 2, a repeating unit represented by Chemical Formula 3, or a combination thereof.

        Chemical Formula 1 wherein in Chemical Formula 1,
R is the same or different and is independently F or $CF_3$, and
* indicates linking to an adjacent atom in the main chain of the polymer.

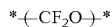        Chemical Formula 2 wherein in Chemical Formula 2,
* indicates linking to an adjacent atom in the main chain of the polymer.

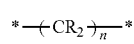        Chemical Formula 3 wherein in Chemical Formula 3,
R is the same or different and is independently hydrogen, F or $CF_3$,
n is an integer ranging from 1 to 20, and
* indicates linking to an adjacent atom in the main chain of the polymer.

The perfluorinated backbone may include a repeating unit represented by Chemical Formula 4:

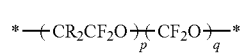        Chemical Formula 4 wherein in Chemical Formula 4,

R is the same or different and is independently F or $CF_3$,

* indicates linking to adjacent atom in a main chain of the polymer, p is about 1 to about 100 (e.g., about 1 to about 100), and q is about 1 to about 100 (e.g., about 1 to about 100).

The crosslinked polymer may have a refractive index of less than about 1.5.

The conductive film may have a sheet resistance variation (sheet resistance change) ratio of less than or equal to about 30% after exposure to a temperature of 85° C. and humidity of 85% for 10 days.

Another embodiment provides an electronic device including the conductive film.

The electronic device may be a display, a touch screen panel, a solar cell, an e-window, an electrochromic mirror, a transparent heater, a heat mirror, a transparent transistor, a transparent strain sensor, or a flexible display.

In the electrically conductive films of the aforementioned embodiments, the protective layer may have resistance to diffusion of water and air, and thereby protect the nanostructures in the conductive film. In addition, the protective layer may enhance optical properties (e.g., light transmittance and haze) of the entire conductive film. As a result, the electrically conductive films may maintain their electrical properties even when they are exposed to severe environmental conditions and thereby may exhibit enhanced long term stability, together with improved light transmittance and lower haze. Therefore, the aforementioned electrically conductive films may find their utilities in a touch screen panel or a transparent electrode included in a next generation display for various (portable) electronic devices such as a smart phone, a table PC, a wearable device, and E-paper.

BRIEF DESCRIPTION OF THE DRAWINGS

The above and other advantages and features of this disclosure will become more apparent by describing exemplary embodiments thereof in further detail with reference to the accompanying drawings, in which:

FIG. 2 is a schematic view showing a cross section structure of a touch screen panel including the conductive film according to an embodiment;

DETAILED DESCRIPTION

Figure 1:
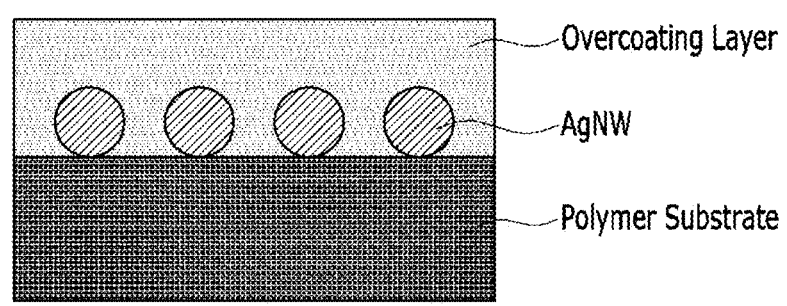
FIG. 1 is a schematic view showing the cross-section of a conductive film according to an embodiment.

Advantages and characteristics of this disclosure, and a method for achieving the same, will become evident referring to the following exemplary embodiments together with the drawings attached hereto. The embodiments, may, however, be embodied in many different forms and should not be construed as being limited to the embodiments set forth herein. If not defined otherwise, all terms (including technical and scientific terms) in the specification may be defined as commonly understood by one skilled in the art. The terms defined in a generally-used dictionary may not be interpreted ideally or exaggeratedly unless clearly defined. In addition, unless explicitly described to the contrary, the word "comprise" and variations such as "comprises" or "comprising" will be understood to imply the inclusion of stated elements but not the exclusion of any other elements.

Exemplary embodiments are described herein with reference to illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Further, the singular includes the plural unless mentioned otherwise.

In the drawings, the thickness of layers, films, panels, regions, etc., are exaggerated for clarity. Like reference numerals designate like elements throughout the specification.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise. Unless specified otherwise, the term "or" means "and/or." As used herein, the term "and/or" includes any and all combinations of one or more of the associated items. Expressions such as "at least one of," when preceding a list of elements, modify the entire list of elements and do not modify the individual elements of the list.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, the term "combination thereof" refers to a mixture, a stacked structure, a composite, an alloy, a blend, a reaction product, or the like. As used herein, the term "alkyl group" may refer to a straight or branched chain saturated aliphatic hydrocarbon group having the specified number of carbon atoms and having a valence of at least one.

As used herein, the term "(meth)acrylate" refers to acrylate and methacrylate.

A conductive film according to an embodiment includes:
 a substrate;
 an electrically conductive layer disposed on the substrate, wherein the electrically conductive layer includes a plurality of nano-sized conductors; and
 a protective layer directly disposed on the electrically conductive layer, wherein the protective layer includes a crosslinked polymer having a perfluorinated backbone.

The conductive film may be a transparent conductive film. The conductive film may be a transparent electrode.

The substrate may be a transparent substrate. The substrate may be flexible. A material of the substrate is not particularly limited, and the substrate may be a glass substrate, a semiconductor substrate, a polymer substrate, or a combination thereof. It may be a substrate in which an insulation layer and/or an electrically conductive film are/is stacked. In a non-limiting example, the substrate may include an inorganic material such as glass; a polyester such as polyethylene terephthalate, polybutylene terephthalate, and polyethylene naphthalate; a polycarbonate; an acryl-based polymer; cellulose or a derivative thereof; a polymer such as a polyimide; an organic/inorganic hybrid material; or a combination thereof. The thickness of the substrate is also not particularly limited, and may be appropriately selected depending on the nature of the final product. The substrate may have a thickness of greater than or equal to about 0.5 micrometers (μm), for example, greater than or equal to about 1 μm, greater than or equal to about 10 μm, but is not limited thereto. The substrate may have a thickness of less than or equal to about 1 millimeters (mm), for example, less than or equal to about 500 μm, or less than or equal to about 200 μm, but is not limited thereto. An additional layer (e.g., undercoat) may be provided between the substrate and the electrically conductive layer as needed (e.g., in order to control a refractive index).

An electrically conductive layer including a plurality of nano-sized conductors is disposed on the substrate. As used herein, the term "nano-sized conductors" refers to an electrically conducting two-dimensional (2D) nano material having thickness values in a nanometer scale or an electrically conducting one-dimensional (1D) nano material having a diameter in a nanometer scale. The electrically conductive layer may include a discontinuous layer including two or more of the nano-sized conductors, wherein two or more of the nano-sized conductors contact one another to provide an electrical connection. In an embodiment, the electrically conductive layer includes an open space disposed between the nano-sized conductors, and an area ratio of the open space relative to the total area of the electrically conductive layer may be less than or equal to about 50%, for example, less than or equal to about 40%, less than or equal to about 35%, or less than or equal to about 30%.

In an embodiment, the nano-sized conductor may be an electrically conductive metal nano wire; a conductive nano sheet such as an electrically conductive metal nano sheet, an electrically conductive metal oxide nano sheet, an electrically conductive metal chalcogenide nano sheet and the like; an electrically conductive metal nano mesh; an electrically conductive carbon nanotube; or a combination thereof. Such a nano-sized conductor may be commercially available or may be prepared by a known method.

For example, the electrically conductive metal nano wire may have a diameter of less than or equal to about 50 nanometers (nm), for example, less than or equal to about 40 nm, or less than or equal to about 30 nm. A length of the electrically conductive metal nano wire is not particularly limited, and may be selected depending on its diameter. For example, the length of the electrically conductive metal nano wire may be greater than or equal to about 1 μm, greater than or equal to about 2 μm, greater than or equal to about 3 μm, greater than or equal to about 4 μm, or greater than or equal to about 5 μm, but is not limited thereto. In another embodiment, the length of the electrically conductive metal nano wire may be greater than or equal to about 10 μm, for example, greater than or equal to about 11 μm, greater than or equal to about 12 μm, greater than or equal to about 13 μm, greater than or equal to about 14 μm, or greater than or equal to about 15 μm. An aspect ratio of the electrically conductive metal nano wire may be greater than or equal to about 100, but is not limited thereto. The electrically conductive metal nano wire may include silver (Ag), copper (Cu), gold (Au), aluminum (Al), cobalt (Co), palladium (Pd), or a combination thereof (e.g., nanometal wires having an alloy thereof, or two or more segments). Such an electrically conductive metal nano wire may be prepared by a known method, or may be commercially available. The electrically conductive metal nano wire may be a silver (Ag) nano wire. The nano wire may include a polymer coating of polyvinylpyrrolidone and the like on its surface.

The electrically conductive nano sheet may include a metal sheet having a nanometer-range thickness, an electrically conductive metal oxide sheet having a nanometer-range thickness, an electrically conductive metal chalcogenide nano sheet having a nanometer-range thickness, and the like. The conductive nano sheet may have a lateral size of greater than or equal to about 0.1 μm, for example, greater than or equal to about 1 μm to several micrometers or greater, without limitation. The metal nano sheet, metal oxide nano sheet such as ruthenium oxide, metal chalcogenide nano sheet such as transition metal dichalcogenide may be prepared by a known method or may be commercially available.

For example, the electrically conductive nano sheet (nano flake) such as the electrically conductive metal oxide or transition metal dichalcogenide may be prepared by methods disclosed in KR 10-0600412, WO 2003041183, or WO 2002095841 A2, the entire contents of these documents being incorporated herein by reference, or by similar methods.

The metal nano mesh may have a nano-sized net structure using a metal. The net structure may have a thickness of less than or equal to about 1 μm but is not limited thereto. A method of preparing such electrically conductive metal nano mesh is known to one of ordinary skill in the art (for example, described in KR 10-1328483, the entire content of which are incorporated herein by reference).

The electrically conductive carbon nanotube may be a carbon allotrope having a cylindrical nano structure. The electrically conductive carbon nanotube may be prepared by a known method, or may be commercially available.

The electrically conductive layer may include an organic binder for biding the plurality of nano-sized conductors (e.g., nano wires). The binder controls viscosity of a composition for forming an electrically conductive layer as desired and increases binding the nano-sized conductors on a substrate. Non-limiting examples of the binder may include methyl cellulose, ethyl cellulose, hydroxypropyl methyl cellulose (HPMC), hydroxypropyl cellulose (HPC), xanthan gum, polyvinyl alcohol (PVA), polyvinyl pyrrolidone (PVP), carboxymethyl cellulose, hydroxyethyl cellulose, or a combination thereof. An amount of the binder may be appropriately selected and is not particularly limited thereto. An amount of the binder may be about 1 to about 100 parts by weight, for example, about 10 to about 100 parts by weight, based on 100 parts by weight of the nano-sized conductors, but is not limited thereto.

The electrically conductive layer may be formed on the substrate by a known method. For example, a coating composition including the nano-sized conductors (e.g., nano wire or nano sheet) is applied on a substrate, and a solvent is removed. The coating composition including the nano-sized conductor may include an appropriate solvent (e.g., water, an organic solvent miscible or non-miscible with water, etc.) and may further include a dispersing agent, both of which are known in the art. For example, an ink composition including nano wires are commercially available. The composition is applied on a substrate, and optionally dried and/or heat-treated to prepare an electrically conductive layer. The composition may be applied by various methods, for example, by bar coating, blade coating, slot die coating, spray coating, spin coating, gravure coating, inkjet printing, or a combination thereof.

A conductive film according to an embodiment includes a protective layer disposed directly on the electrically conductive layer, and the protective layer includes a crosslinked polymer having a perfluorinated backbone. As shown in FIG. 1, the protective layer may improve optical properties of an electrode without having a substantial influence on electrical properties of the electrically conductive layer and the conductive film. The protective layer may also prevent or minimize damage on the electrically conductive layer by a mechanical contact or by action of an external factor (e.g., moisture, air, various chemical materials, etc.).

With an increasing demand for a flexible conductive film, various attempts to use a nano-sized conductor such as graphene, carbon nanotube, metal mesh, or metal nano wire as an electrically conductive material for the conductive film have been made. However, the above nano-sized conductors (unlike ITO) may be readily damaged by an external force such as mechanical friction or by action of a chemical material (e.g., $NO_2$, OCS, $H_2S$, $H_2O$, etc.).

For example, the silver nano wire is reacted with the chemical material according to the following formula, and thus may be converted into $Ag_2S$ having high resistance:

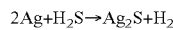
$2Ag+H_2S \rightarrow Ag_2S+H_2$

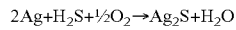
$2Ag+H_2S+\frac{1}{2}O_2 \rightarrow Ag_2S+H_2O$

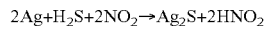
$2Ag+H_2S+2NO_2 \rightarrow Ag_2S+2HNO_2$

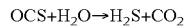
$OCS+H_2O \rightarrow H_2S+CO_2$

In order to solve such problems, a polymer-based protective layer is disposed on the surface of the electrically conductive layer including these nano-sized conductors. However, it may be difficult for the most of the polymer-based protective layer to effectively protect the nano-sized conductors at a high temperature under high humidity conditions. The polymer-based protective layer may also have a limit in improving optical properties of the conductive film. In addition, the protective layer may be required to have a thickness (e.g., less than or equal to about 200 nm), which is low enough to prevent deterioration of electrical properties of the electrically conductive layer. The protected layer may also be required to have a lower refractive index than the refractive index of a substrate for light transmittance. In addition, the protective layer may be required to have a low permeation rate of the gas/moisture for stability (e.g. about electrical properties).

According to an embodiment, a conductive film may satisfy the above requirements. For example, in the conductive film according to the embodiment, the protective layer includes a crosslinked polymer having a perfluorinated backbone, and thus may have improved optical properties over the conductive film. The protective layer may also protect the electrically conductive layer from an external force or external environmental factors.

A transparent conductive film including a substrate, the electrically conductive layer, and the protective layer may have light transmittance that is determined by a light absorption degree and reflectance of each constituent element. When the substrate and the electrically conductive layer have a similar light transmittance, light transmittance over the conductive film may depend on a surface reflectance degree, and the surface reflectance degree relates to a refractive index of the protective layer. For example, when the protective layer has a lower refractive index than the substrate, the surface reflectance degree may be decreased, and thus total transmittance of the conductive film may be improved. A urethane acrylate protective layer used in a conventional art has a higher refractive index of about 1.5 compared to the protective layer, and thus may hardly contribute to improving light transmittance of the conductive film. On the contrary, in the conductive film according to the embodiment, a crosslinked polymer included in the protective layer has a perfluorinated backbone, and thus a much lower refractive index. For example, the crosslinked polymer may have a refractive index of less than about 1.5, for example, less than or equal to about 1.45, for example less than or equal to about 1.44, less than or equal to about 1.43, less than or equal to about 1.42, or less than or equal to about 1.41.

The perfluorinated backbone may include a linear or branched perfluoropolyether, a linear or branched perfluoropolyolefin, a linear or branched fluoropolyolefin, or a combination thereof.

The perfluorinated backbone may have a weight average molecular weight of greater than or equal to about 1,000 Daltons (Da), for example, greater than or equal to about 1,100 Da, greater than or equal to about 1,200 Da, greater than or equal to about 1,300 Da, greater than or equal to about 1,400 Da, greater than or equal to about 1,500 Da, greater than or equal to about 1,600 Da, greater than or equal to about 1,700 Da, greater than or equal to about 1,800 Da, greater than or equal to about 1,900 Da, greater than or equal to about 2,000 Da, greater than or equal to about 2,500 Da, greater than or equal to about 3,000 Da, greater than or equal to about 3,500 Da, greater than or equal to about 4,000 Da, greater than or equal to about 4,500 Da, greater than or equal to about 5,000 Da, greater than or equal to about 5,500 Da, greater than or equal to about 6,000 Da, greater than or equal to about 6,500 Da, greater than or equal to about 7,000 Da, or greater than or equal to about or 7,500 Da. The weight average molecular weight of the perfluorinated backbone may be controlled by varying a molecular weight of perfluorinated polymer diol, and may modulate protection performance of a protective layer, which will be described below.

The perfluorinated backbone may include a repeating unit represented by Chemical Formula 1, a repeating unit represented by Chemical Formula 2, a repeating unit represented by Chemical Formula 3, or a combination thereof.

   Chemical Formula 1

In Chemical Formula 1,

R is the same or different and is independently F or $CF_3$, and

* indicates linking to an adjacent atom in the main chain of the polymer.

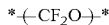   Chemical Formula 2

In Chemical Formula 2,

* indicates linking to an adjacent atom in the main chain of the polymer.

   Chemical Formula 3

In Chemical Formula 3,

R is the same or different and is independently hydrogen, F or $CF_3$, n is an integer ranging from 1 to 20, and

* indicates linking to an adjacent atom in the main chain of the polymer.

In Chemical Formula 3, at least one R may be F or $CF_3$.

The perfluorinated backbone includes the moiety represented by Chemical Formula 1 and the moiety represented by Chemical Formula 2, and a mole ratio of the moiety represented by Chemical Formula 1: the moiety represented by Chemical Formula 2 may be about 1:0.1 to about 1:10, for example, about 1:1 to about 1:5, but is not limited thereto.

The perfluorinated backbone may include a repeating unit represented by Chemical Formula 1 and a repeating unit represented by Chemical Formula Chemical Formula 2. In an embodiment, the perfluorinated backbone may include a repeating unit represented by Chemical Formula 4:

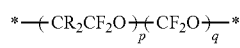   Chemical Formula 4 wherein in Chemical Formula 4,

R is the same or different and is independently F or $CF_3$,

* indicates linking to an adjacent atom in the main chain of the polymer, p is 1 to 100, and q is t to 100.

In an embodiment, p may be 1 to 50 and q may be 1 to 50.

The protective layer includes a crosslinked polymer having a perfluorinated backbone. The crosslinked polymer may include a cross-linking bond formed by a reaction of (meth)acrylate groups. This crosslinked polymer may be obtained by cross-linking a polymer (e.g., by a radical reaction of the carbon-carbon double bonds) having a perfluorinated backbone and one or more (meth)acrylate groups at the terminal end (e.g., one terminal end or both terminal ends). The polymer having a perfluorinated backbone and a (meth)acrylate group at the terminal end may be obtained by a reaction between a perfluoroalkane or a perfluoropolyether having a reactive moiety (e.g., a hydroxy group, a carboxyl group, —OPO(OH)$_2$, an isocyanate group, etc.) at both terminal ends and a compound having a (meth)acrylate group, which is capable of reacting with the reactive moiety. The reaction may be performed under specific conditions (a catalyst, a solvent, a temperature, time, etc.) selected depending on the nature of the reactive moiety.

The molecular chains of the fluorine-based polymer according to a conventional art may hardly be cross-linked, and thus specific conditions (e.g., a nitrogen atmosphere) need to be employed for carrying out the cross-linking process. However, in the conductive film according to the embodiment, the crosslinked polymer may have a cross-linking bond formed through a reaction of (meth)acrylate groups. Such a polymer has a high cross-linking degree and a dense structure by adjusting the molecular weight of the perfluorinated backbone and the number of the (meth)acrylate groups. As a result, the crosslinked polymer may show decreased gas transmittance and decreased moisture transmittance, and the protective layer including the crosslinked polymer may effectively protect the electrically conductive layer from severe external environmental conditions (e.g., 85% of relative humidity and 85° C. of a temperature), and thus improve stability of a transparent electrode. For example, the conductive film may have a sheet resistance variation ratio of less than or equal to about 30%, less than or equal to about 25%, or less than or equal to about 20% after exposure to a temperature of 85° C. and humidity of 85% for 10 days.

In an embodiment, the crosslinked polymer may include a crosslinked polymer of urethane (meth)acrylate. As used herein, the urethane (meth)acrylate refers to a polymer including at least one urethane group in the main chain and one or more polymerizable (meth)acrylate groups at one or both terminal ends thereof.

In some embodiment, the urethane (meth)acrylate having a perfluorinated backbone may be synthesized by a reaction between perfluorinated diol and isocyanate compound with a reactive (meth)acrylate compound. In some embodiment, an intermediate prepolymer such as a urethane prepolymer may be subject to an end-capping process with a reactive (meth)acrylate compound to produce the urethane (meth)acrylate having a perfluorinated backbone. The perfluorinated diol may be C3 to C20 fluorinated alkane diol such as 1H,1H,10H ,10H-perfluoro-1,10-decanediol.

The perfluorinated diol may be perfluoropolyether diol, which is commercially available from DuPont, Solvay Solexis, 3M, and other sources.

In non-limiting examples, the perfluoropolyether diol may be represented by the following chemical formula:

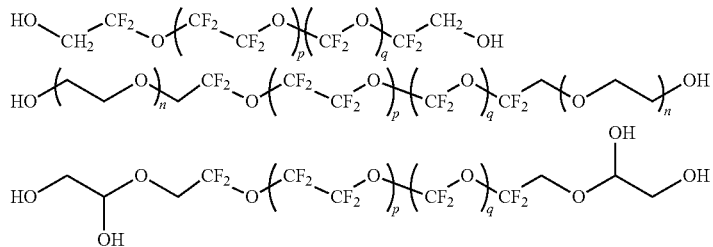

The perfluorinated diol may have a molecular weight appropriately selected depending on a desired molecular weight of the perfluorinated backbone. In the above formulae, perfluoropolyether diols having various ratios of p and q are commercially available, and thus perfluoropolyether diol having an appropriate value may be selected.

The isocyanate compound may be a diisocyanate compound or a (meth)acrylate isocyanate. The diisocyanate compound may be diisocyanate including a C6 to C40 alicyclic moiety such as isophorone diisocyanate (IPDI), diisocyanate including a C6 to C40 aromatic moiety such as toluene diisocyanate, but is not limited thereto. The (meth) acrylate isocyanate may be isocyanatoalkyl methacrylate, wherein the term "alkyl" may refer to a C1 to C20 alkyl group (e.g., 2-isocyanatoethyl methacrylate, etc.), but is not limited thereto.

A reaction between the perfluorinated diol (e.g., perfluoropolyether diol) and the isocyanate compound may be performed in the presence of any catalyst such as alkyltin, wherein the term "alkyl" may refer to a C1 to C20 alkyl group (e.g., dibutyl tin dilaurate etc.). The reaction between the perfluorinated diol and the isocyanate compound may be performed in a reaction solvent (e.g., acetone, 1,1,2-trichlorotrifluoroethane, etc.) that dissolves the perfluorinated diol and the isocyanate compound and does not participate in the reaction, and a reaction temperature and a reaction time may be selected depending on the types of the diol and the isocyanate compounds, a desirable polymerization degree, or the like. For example, the reaction may be performed at a temperature of about 25° C. to about 75° C. (e.g., about 40° C. to about 65° C.) for about 1 hour or greater, for example about 2 hours or greater, about 3 hours or greater, about 4 hours or greater, about 5 hours or greater, about 6 hours or greater, about 7 hours or greater, about 8 hours or greater, about 9 hours or greater, or about 10 hours or greater, but is not limited thereto.

In the reaction between the perfluorinated diol and the isocyanate compound, reaction products may have isocyanate groups at both terminal ends by controlling a mole ratio between the diol and the isocyanate compound.

The intermediate prepolymer, which is the reaction product of the perfluorinated diol and the isocyanate compound (hereinafter, a urethane prepolymer) is reacted with a compound (hereinafter, a reactive (meth)acrylate compound) having a reactive moiety and at least one (meth)acrylate group such as hydroxyalkyl(meth)acrylate, wherein the term "alkyl" may refer to a C1 to C20 alkyl group, to provide urethane(meth)acrylate that has at least one (meth)acrylate groups at each of the terminal ends (e.g., one or at least two (meth)acrylate groups per each terminal end) and also has the perfluorinated backbone.

The reaction between the urethane prepolymer and the reactive (meth)acrylate compound may be performed under specific conditions appropriately selected depending on a reactive moiety of the reactive (meth)acrylate compound. For example, the reaction may be performed in the above reaction solvent at about 40 to about 70° C. for greater than or equal to about 1 hour, for example, greater than or equal to about 2 hours but is not limited thereto.

The protective layer including the crosslinked polymer may improve optical characteristics (e.g., light transmittance and haze) of a conductive film as well as may effectively protect the electrically conductive layer right underneath the same from moisture, air, and various chemical substances as described above.

In an embodiment, the protective layer may be formed in the following manner. A composition including a precursor of the crosslinked polymer (e.g., a polymer having one or more (meth)acrylate group and a perfluorinated backbone) and optionally, a solvent, a photoinitiator, a thermal initiator, or the like may be prepared.

The solvent may be any organic solvent that is capable of dissolving/dispersing components in the composition. For example, the solvent may be an acetate such as iso-butyl acetate (IBA), but is not limited thereto. The photoinitiator and thermal initiator may be any initiator capable of generating radicals for reactions of (meth)acrylate groups, but is not particularly limited. For example, the initiator may be azobisisobutyronitrile (AIBN), benzyl dimethyl ketal, a peroxide-based initiator such as benzoyl peroxide, but is not limited thereto.

In the composition, an amount of each component is not particularly limited, and may be appropriately selected by taking into account coating properties, reactivity of precursors of the crosslinked polymer, and the like. For example, the composition may include the initiator in an amount of less than or equal to about 5 parts by weight, for example, less than or equal to about 4 parts by weight, less than or equal to about 3 parts by weight, less than or equal to about 2 parts by weight, less than or equal to about 1 part by weight, less than or equal to about 0.9 parts by weight, less than or equal to about 0.8 parts by weight, less than or equal to about 0.7 parts by weight, less than or equal to about 0.6 parts by weight, less than or equal to about 0.5 parts by weight, less than or equal to about 0.4 parts by weight, less than or equal to about 0.3 parts by weight, less than or equal to about 0.2 parts by weight, less than or equal to about or 0.1 parts by weight per 100 parts by weight of the polymer precursor without limitation. An amount of the initiator may be selected depending on the number of functional groups in the polymer precursor.

A solid content of the composition may be less than or equal to about 10 percent by weight (wt %), for example, less than or equal to about 9 wt %, less than or equal to about 8 wt %, less than or equal to about 7 wt %, less than or equal to about 6 wt %, less than or equal to about or 5 wt %, but is not limited thereto. The solid content may be selected by taking into consideration coating properties of the composition and a thickness of the protective layer.

The prepared composition may be coated on the electrically conductive layer by an appropriate method. The coating may be performed in the same manner as described in the above electrically conductive layer. The coated composition may be optionally dried, and then may be heated or exposed (e.g., by radiating UV) to perform a cross-linking polymerization (e.g., a thermal polymerization or a photopolymerization) to obtain a protective layer including a crosslinked polymer.

The conductive films of the aforementioned embodiments may find their utilities in the field of an electronic device such as a flat or curved display, a touch screen panel, a solar cell, an e-window, an electrochromic mirror, a transparent heater, a heat mirror, a transparent transistor, a transparent strain sensor, or a flexible display, for example a transparent electrode. The conductive film may be used as a functional glass, or an anti-static film. In particular, the conductive film may be applied to a flexible electronic device due to excellent flexibility.

Hereinafter, a touch screen panel as an example of the electronic device including the conductive film is described. The detailed structure of the touch screen panel is well known. The schematic structure of the touch screen panel is shown in FIG. 2. Referring to FIG. 2, the touch screen panel may include a first conductive film, a first transparent adhesive film (e.g., an optically clear adhesive (OCA) film), a second conductive film, a second transparent adhesive film, and a window for a display device, on a panel for a display device (e.g., an LCD panel). The first conductive film and/or second conductive film may be the conductive film according an embodiment.

In addition, an example of applying the conductive film according to exemplary embodiments to a touch screen panel is illustrated, but a conductive film according to exemplary embodiments may be used as an electrode for other electronic devices including a conductive film without a particular limit. For example, the conductive film according to exemplary embodiments may be applied as a pixel electrode and/or a common electrode for a liquid crystal display (LCD), an anode and/or a cathode for an organic light emitting diode device, or a display electrode for a plasma display device. In addition, the conductive film may be used as a functional glass or an anti-static layer.

Hereinafter, the embodiments are illustrated in more detail with reference to examples. These examples, however, are not in any sense to be interpreted as limiting the scope of this disclosure.

EXAMPLES

Measurement Method:

[1] Sheet Resistance: measured as follows.

Sheet resistance is measured by using a 4 point sheet resistance meter (Manufacturer: EDTM, Inc., Model No.: R-Check). Each sheet resistance at 24 points with a reference to a A4 size is measured and averaged.

[2] Light Transmittance and Haze: 12 times measured by using a turbidimeter (Manufacturer: NIPPON DENSHOKU INDUSTRIES, Model No.: NDH-7000 SP) and averaged.

[3] Scanning Electron Microscope (SEM) Analysis: analyzed by using an FE-SEM (Field Emission Scanning Electron Microscopy) Hitachi (SU-8030) equipment.

Reference Example 1

Preparation of Crosslinked Polymer Precursor I having Perfluorinated Backbone and One Acrylate Moiety at Both Ends Perfluoropolyether diol (purchased from: Solvey Solexis, Product Name: Fluorolink E, Molecular weight: 1,000 grams per mole, g/mol) is dissolved in a solvent (1,1,2-trichlorotrifluoroethane) under a nitrogen atmosphere. Dibutyl tin laurate and isophorone diisocyanate are slowly added thereto by drops, and the mixture is stirred and reacted at 30° C. As a result, a solution including a urethane polymer having an isocyanate group at the terminal end is obtained.

Subsequently, hydroxyethyl(meth)acrylate as a reactive acrylate compound is slowly added thereto, and the mixture is stirred at 60° C. for 24 hours to cap the isocyanate at the terminal end of the urethane polymer.

The solvent is removed from the reaction product to obtain a crosslinked polymer precursor having a (meth)acrylate group at both terminal ends.

Reference Example 2

Preparation of Crosslinked Polymer Precursor II having Perfluorinated Backbone and Two Acrylate Moieties at Both Terminal Ends A crosslinked polymer precursor having two methacrylate groups at both terminal ends (i.e., four functional groups in total per chain) is obtained according to the same method as described in Reference Example 1 except for using hydroxyethyl methacrylate as a reactive acrylate compound.

Reference Example 3

Preparation of Crosslinked Polymer Precursor III having Perfluorinated Backbone and Two Acrylate Moieties at Both Terminal Ends A crosslinked polymer precursor having two methacrylate groups at both terminal ends (i.e., four functional groups in total per chain) is obtained according to the same method as described in Reference Example 1 except for using perfluoropolyether diol having the following structure (Purchase: Solvey Solexis, tradename: Fluorolink E, Molecular weight: 4000 g/mol) and hydroxyethyl methacrylate as a reactive acrylate compound.

Reference Example 4

Preparation of Crosslinked Polymer Precursor IV having Perfluorinated Backbone and Two Acrylate Moieties at Both Ends A crosslinked polymer precursor having two methacrylate groups at both terminal ends (i.e., four functional groups in total per chain) is obtained according to the same method as described in Reference Example 1 except for using perfluoropolyether diol having the following structure (Purchase: Solvey Solexis, Product name: Fluorolink E, Molecular weight: 8000 g/mol) and hydroxyethyl methacrylate as a reactive acrylate compound.

Experimental Example 1

A protective layer coating composition is obtained by dissolving 4 grams (g) of the crosslinked polymer precursor (a refractive index: 1.4) according to Reference Example 1 in 100 milliliters (mL) of a solvent and adding 0.04 g of benzyl dimethyl ketal as a photoinitiator thereto and dissolving it therein. The obtained protective layer coating composition is coated several times on a polycarbonate substrate (Thickness: 50 µm, Refractive index: 1.6) by using a Mayer bar and dried at 100° C. for 1 minute and then, radiated by a UV lamp (wavelength: 365 nm, dose: 800 milliJoules per square centimeter, mJ/cm$^2$) for 15 seconds to perform a crosslinked polymerization of acrylates and to form a protective layer having a predetermined thickness (50 to 200 nm).

Figure 3:
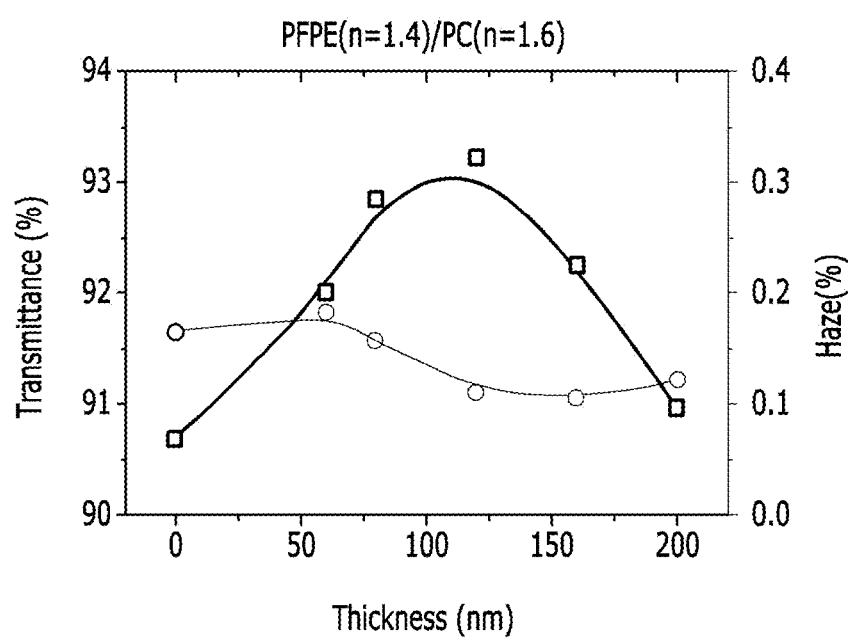
FIG. 3 is a graph of transmittance (percent, %) and haze (percent, %) versus thickness (nanometers, nm) showing light transmittance and haze changes as a function of thickness of a protective layer applied on a polycarbonate (PC) substrate in Experimental Example 1.

Transmittance and haze of the protective layer-substrate structures having each thickness are measured, and the results are provided in FIG. 3. Referring to the results of FIG. 3, the transmittance may be improved up to 3% at most, and the haze may be substantially reduced by the protective layer.

Experimental Example 2

A protective layer-substrate structure is prepared according to the same method as described in Experimental Example 1, except for using a polyethylene terephthalate substrate (Thickness: 50 µm, Refractive index: 1.5) instead of the polycarbonate substrate.

Figure 4:
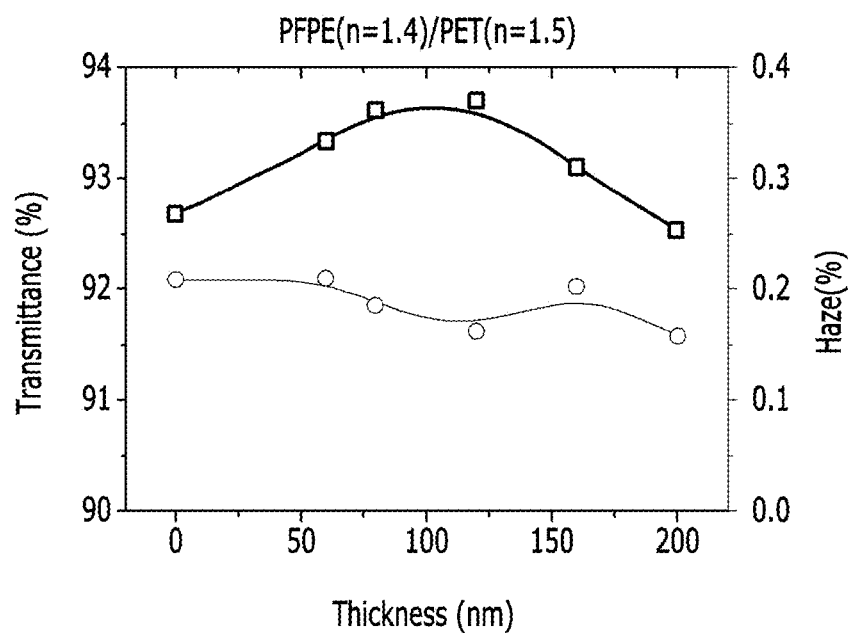
FIG. 4 is a graph of transmittance (percent, %) and haze (percent, %) versus thickness (nanometers, nm) showing light transmittance and haze changes as a function of thickness of a protective layer applied on a polyethylene terephthalate (PET) substrate in Experimental Example 2.

Transmittance and haze of the protective layer-substrate structures having each thickness are measured, and the results are provided in FIG. 4. Referring to the result of FIG. 4, the transmittance may be improved up to 1% at most, and the haze may also be reduced by the protective layer.

Comparative Experimental Example 1

A protective layer-substrate structure is prepared according to the same method as described in Experimental Example 1, except for using 4 g of commercially-available urethane acrylate (Manufacturer: Sukgyung AT Co., Ltd., Refractive index: 1.5) instead of the crosslinked polymer precursor according to Reference Example 1.

Figure 5:
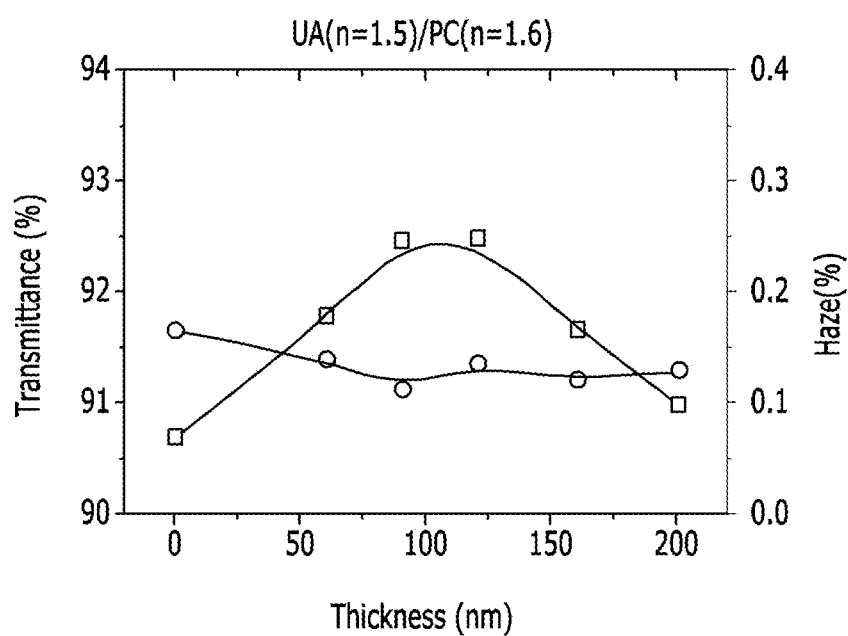
FIG. 5 is a graph of transmittance (percent, %) and haze (percent, %) versus thickness (nanometers, nm) showing light transmittance and haze changes as a function of thickness of a protective layer applied on a polycarbonate substrate in Comparative Experimental Example 1.

Transmittance and haze of the protective layer-substrate structures having each thickness are measured, and the results are shown in FIG. 5. Referring to the results of FIG. 5, the transmittance is less improved, and the haze is less reduced by the protective layer than in Experimental Example 1.

Comparative Experimental Example 2

A protective layer-substrate structure is prepared according to the same method as described in Experimental Example 1 except for using 4 g of commercially-available urethane acrylate (Manufacturer: Sukgyung AT Co., Ltd., Refractive index: 1.5) instead of the crosslinked polymer precursor according to Reference Example 1 and a polyethylene terephthalate substrate (Thickness: 50 µm, Refractive index: 1.5) instead of the polycarbonate substrate.

Figure 6:
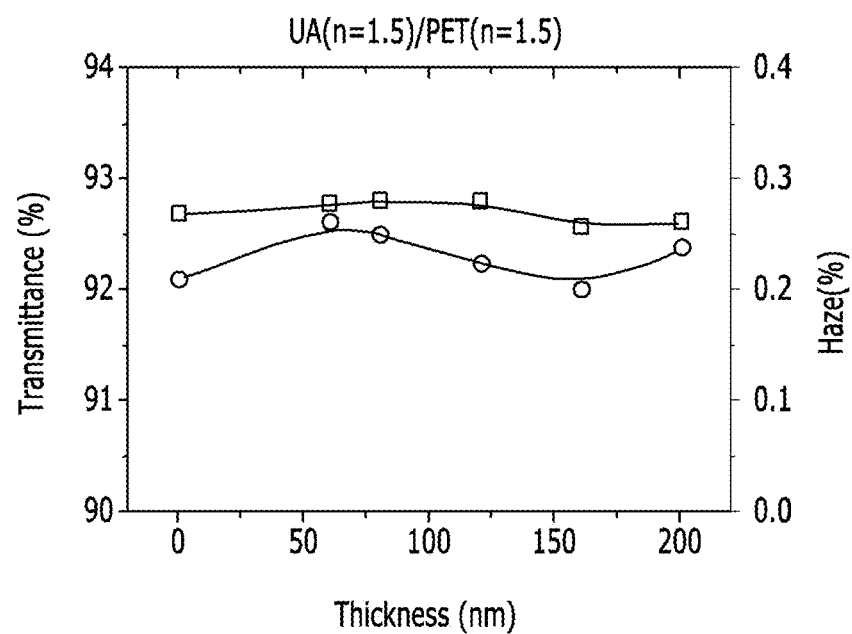
FIG. 6 is a graph of transmittance (percent, %) and haze (percent, %) versus thickness (nanometers, nm) showing light transmittance and haze changes as a function of thickness of a protective layer applied on a polyethylene terephthalate substrate in Comparative Experimental Example 2.

Transmittance and haze of the protective layer-substrate structures having each thickness are measured, and the results are provided in FIG. 6. Referring to the result of FIG. 6, the transmittance is not improved by the protective layer.

Example 1

[1] An aqueous dispersion containing a silver nano wire as a nano-sized conductor (Purchase: Cambrios Co., Ltd., Nanopyxis, Aiden, Silver nano wire weight content: 0.5 wt %, Silver nano wire average diameter: 20-35 nm, average length: 15-30 µm) is prepared. On the other hand, a binder solution is prepared by dissolving 0.25 wt % hydroxypropylmethyl cellulose (HPMC) in distilled water. The silver nano wire solution is mixed with the binder solution, and the mixture is diluted to have a nano wire concentration ranging from 0.1 to 0.2 wt % by using a mixed solution of water and ethanol (a volume ratio of 70:30) to obtain a nano wire aqueous dispersion. The nano wire and the binder are added in a binder/AgNW weight ratio of 0.05 to 0.1 wt/wt %.

[2] The nano wire aqueous dispersion is coated on a polyethylene terephthalate (PET) or polycarbonate (PC) substrate by using an automated bar coater (GBC-A4, GIST) and dried with hot air at 90° C. and in an oven at 100° C. to obtain an electrically conductive layer.

Figure 7:
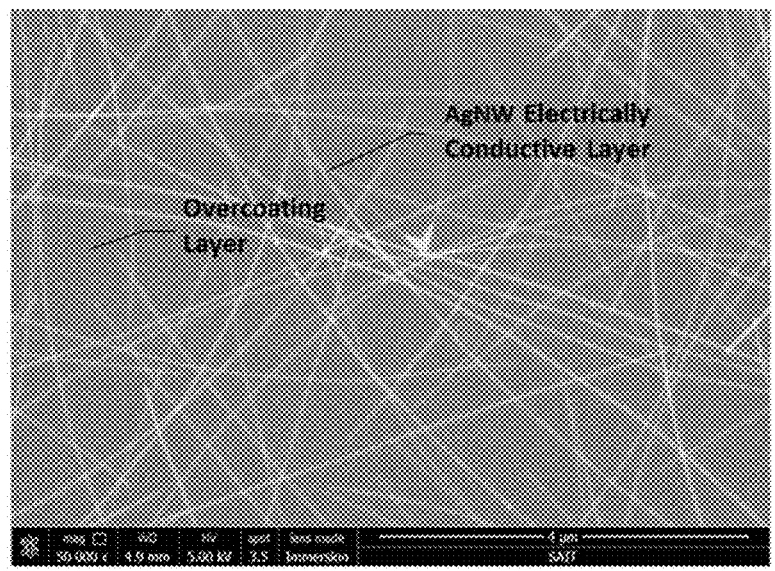
FIG. 7 is a scanning electron microscope image showing the top surface of the conductive film according to Example 1.
Figure 8:
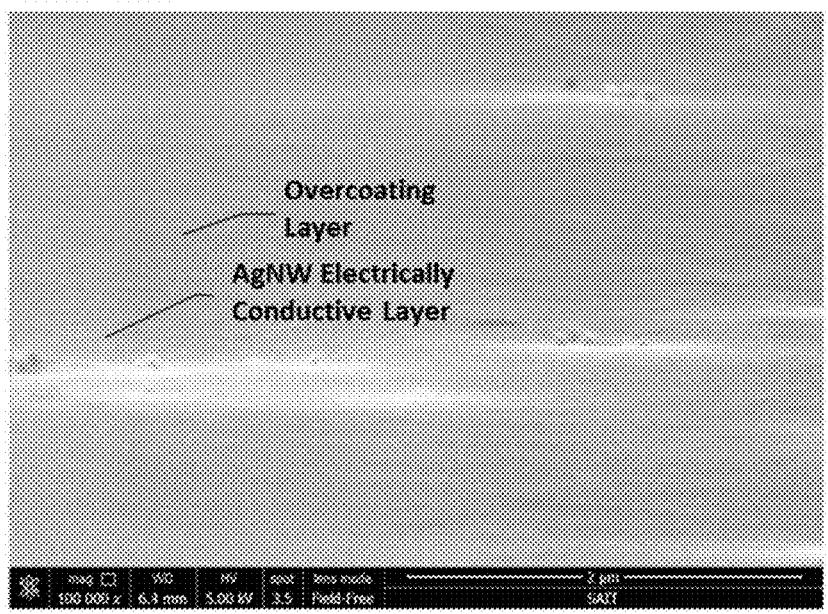
FIG. 8 is a scanning electron microscope image showing the side cross section of the conductive film according to Example 1.

[3] 4 g of the crosslinked polymer precursor according to Reference Example 1 is dissolved in 100 mL of a solvent, and 0.04 g of benzyl dimethyl ketal as a photoinitiator is added thereto, to prepare a protective layer coating composition. The obtained protective layer coating composition is coated on the electrically conductive layer by using a Mayer bar, dried at 100° C. for 1 minute, and radiated by using a UV lamp (Wavelength: 365 nm, Light dose: 800 mJ/cm$^2$) for 15 seconds to perform a crosslinked polymerization of acrylates to obtain an electrically conductive layer. [3] FIG. 7 provides a scanning electron microscope photograph showing the surface having the protective layer of a conductive film. FIG. 8 provides a scanning electron microscope photograph showing the cross section of the conductive film obtained by tilting the conductive film.

Example 2

An electrically conductive layer is formed according to the same method as described in Example 1 except for using the crosslinked polymer precursor according to Reference Example 2.

Example 3

An electrically conductive layer is formed according to the same method as described in Example 1 except for using the crosslinked polymer precursor according to Reference Example 3.

Example 4

An electrically conductive layer is formed according to the same method as described in Example 1 except for using the crosslinked polymer precursor according to Reference Example 4.

Experimental Example 3

Figure 9:
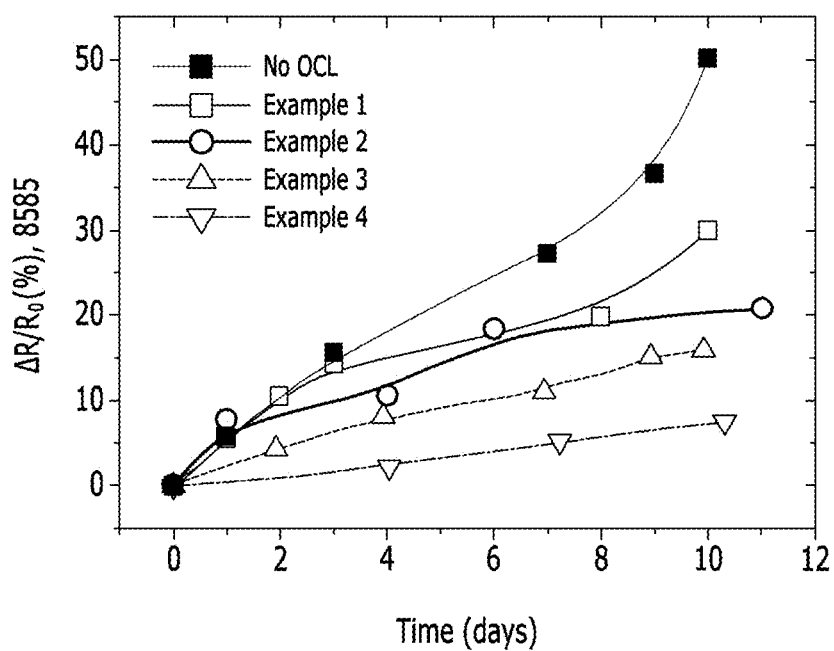
FIG. 9 is a graph of resistance variation ratio $\Delta R/R_0$ (percent, %) versus time (days) showing resistance variation ratios of conductive films as a function of time, when transparent electrodes of Examples 1 to 4 are allowed to stand at 85° C. under humidity of 85%.

A conductive film having no protective layer and the conductive films according to Examples 1 to 4 are allowed to stand at 85° C. under humidity of 85% for 10 days, their sheet resistance variation ratios (%) before and after standing are measured, and the results are provided in Table 1 and FIG. 9.

TABLE 1

| | The number of functional groups per chain of cross-linked precursor polymer | Molecular weight of perfluoro polyether diol | Resistance variation ratio (%) after 10 days |
|---|---|---|---|
| Reference (without protective layer) | — | — | 50% |
| Example 1 | 2 | 1000 | 30% |
| Example 2 | 4 | 1000 | 20% |
| Example 3 | 4 | 4000 | 16% |
| Example 4 | 4 | 8000 | 7% |

Referring to the results of Table 1 and FIG. 9, the conductive films according to Examples 1 to 4 show remarkably improved reliability under a severe environmental conditions.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A conductive film comprising:
   a substrate;
   an electrically conductive layer disposed on the substrate, wherein the electrically conductive layer comprises a plurality of nano-sized conductors; and
   a protective layer disposed directly on the electrically conductive layer, wherein the protective layer comprises a crosslinked polymer formed from curing a composition comprising a crosslinked polymer precursor, wherein the crosslinked polymer precursor accounts for a majority of polymerizable components in the composition,
   wherein the crosslinked polymer precursor comprises a linear or branched extended perfluorinated chain and a (meth)acrylate terminal group,
   wherein a number of the (meth)acrylate terminal groups per the extended perfluorinated chain of the crosslinked polymer is greater than 2,
   wherein the extended perfluorinated chain
   comprises a repeating unit represented by Chemical Formula 4:

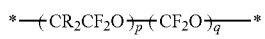  Chemical Formula 4 wherein in Chemical Formula 4,
   R is the same or different and is independently F or CF$_3$,
   * indicates linking to an adjacent atom in the chain of the polymer, and
   wherein
   either p is 1 to 100, and q is 55 to 100, or
   q is 1 to 100, and p is 55 to 100.

2. The conductive film of claim 1, wherein the substrate comprises glass, a polyester, a polycarbonate, a polyimide, or a combination thereof.

3. The conductive film of claim 1, wherein the conductive layer comprises a layer comprising two or more of the nano-sized conductors that are in contact with one another to provide an electrical connection.

4. The conductive film of claim 1, wherein the nano-sized conductor comprises an electrically conductive metal nano wire, an electrically conductive metal nano sheet, an electrically conductive metal oxide nano sheet, an electrically conductive metal chalcogenide nano sheet, an electrically conductive metal nano mesh, graphene, an electrically conductive carbon nanotube, or a combination thereof.

5. The conductive film of claim 1, wherein the electrically conductive layer further comprises an organic binder for binding the nano-sized conductors.

6. The conductive film of claim 1, wherein the (meth) acrylate terminal group comprises a urethane(meth)acrylate terminal group.

7. The conductive film of claim 6, wherein the urethane (meth)acrylate monomer comprises a C6 to C10 alicyclic moiety or a C6 to C10 aromatic moiety.

8. The conductive film of claim 1, wherein the extended perfluorinated chain comprises a repeating unit represented by Chemical Formula 1, a repeating unit represented by Chemical Formula 2, a repeating unit represented by Chemical Formula 3, or a combination thereof:

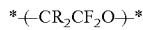  Chemical Formula 1 wherein in Chemical Formula 1,
R is the same or different and is independently F or CF$_3$, and
* indicates linking to an adjacent atom in the chain of the polymer;

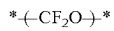  Chemical Formula 2, wherein in Chemical Formula 2,
* indicates linking to an adjacent atom in the chain of the polymer;

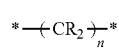  Chemical Formula 3 wherein in Chemical Formula 3,
R is the same or different and is independently hydrogen, F, or CF$_3$,
n is an integer ranging from 1 to 20, and
* indicates linking to an adjacent atom in the chain of the polymer.

9. The conductive film of claim 8, wherein the extended perfluorinated chain comprises the repeating unit represented by Chemical Formula 1 and the repeating unit represented by Chemical Formula 2.

10. The conductive film of claim 8, wherein the extended perfluorinated chain comprises a repeating unit represented by Chemical Formula 4:

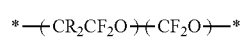  Chemical Formula 4 wherein in Chemical Formula 4,
R is the same or different and is independently F or CF$_3$,
* indicates linking to an adjacent atom in the chain of the polymer,
p is about 1 to about 100, and
q is about 1 to about 100.

11. The conductive film of claim 1, wherein the crosslinked polymer has a refractive index of less than about 1.5.

12. The conductive film of claim 1, wherein the conductive film has a sheet resistance variation ratio of less than or equal to about 30% after exposure to a temperature of 85° C. and humidity of 85% for 10 days.

13. An electronic device comprising the conductive film of claim 1.

14. The electronic device of claim 13, wherein the electronic device is a display, a touch screen panel, a solar cell, an e-window, an electrochromic mirror, a transparent heater, a heat mirror, a transparent transistor, a transparent strain sensor, or a flexible display.

15. The conductive film of claim 1, wherein the nano-sized conductors of the electrically conductive layer are spaced apart, wherein the ratio of an area of the total spaces between the nano-sized conductors relative to the total area of the electrically conductive layer occupied by the nano-sized conductors and the spaces between the nano-sized conductors is equal to or less than about 50%, and wherein the spaces between the nano-sized conductors is filled with the crosslinked polymer of the protective layer.

16. The conductive film of claim 1, wherein the number of (meth)acrylate terminal groups per the extended perfluorinated chain of the crosslinked polymer is 4.

* * * * *